R. SAFELY.
Straightening Shafting.
No. 60,260. Patented Dec 4, 1866.
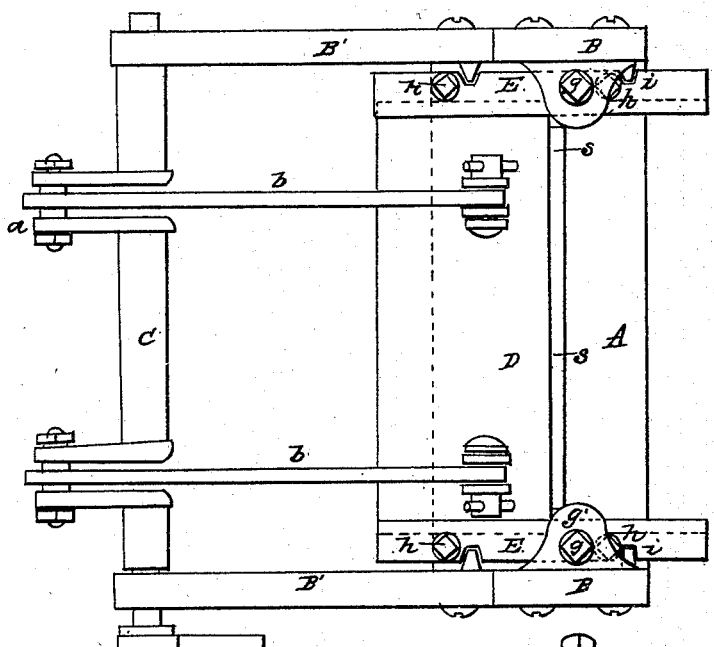
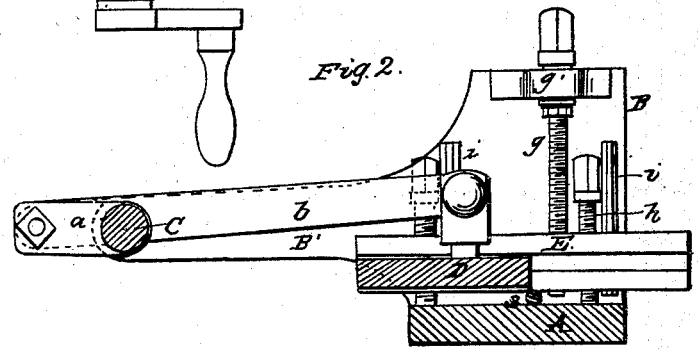
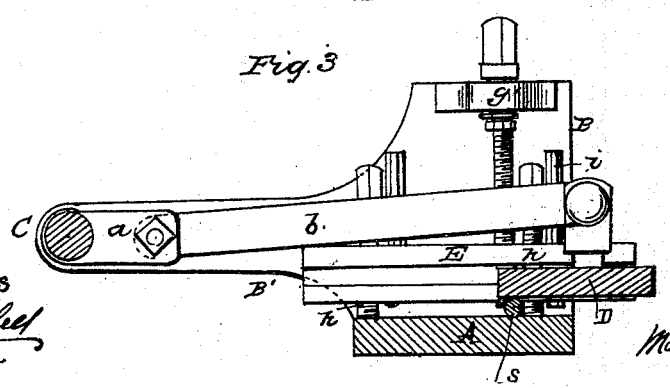

United States Patent Office.

IMPROVEMENT IN MACHINES FOR STRAIGHTENING SHAFTING.

ROBERT SAFELY, OF COHOES, NEW YORK.

Letters Patent No. 60,260, dated December 4, 1866.

SPECIFICATION.

TO ALL WHOM IT MAY CONCERN:

Be it known that I, ROBERT SAFELY, of Cohoes, Albany county, State of New York, have invented a new and useful Machine for Straightening Metal Shafting; and I do hereby declare that the following is a full, clear, and exact description thereof, reference being had to the accompanying drawings, making a part of this specification, in which—

Figure 1 is a plan view of the straightening machine.

Figure 2 is a longitudinal section taken vertically through the centre of fig. 1.

Figure 3 is a similar section showing the parts in position for receiving a shaft or rod to be straightened.

Similar letters of reference indicate corresponding parts in the several figures.

In the manufacture of iron shafts, the usual practice has been to leave them, while hot, upon the ground, thus rendering them liable to become crooked more or less, so that they require to be straightened before they can be used, an operation which has been very laborious and costly. The object of my invention is to obtain a machine by which shafts of various diameters can be readily straightened, while in a heated state, so as to remain permanently true, as will be hereinafter described.

To enable others skilled in the art to understand my invention, I will describe its construction and operation.

In the accompanying drawings, A represents the rectangular bed-plate, upon which the shafts or rods are rolled and straightened. This bed-plate may be made of any required length and width, and its upper surface should be planed true and supported in a horizontal plane. At the ends of said bed-plate, A, are erected, perpendicularly to its surface, two standards, which have long arms B' B', extending out horizontally from them, and in planes parallel with them, as shown in figs. 1 and 2. The rear ends of the arms of the standards, B B, serve as supports and bearings for a transverse crank-shaft, C, having two bell-cranks $a\,a$ formed on it at equal distances from the arms B'. The shaft C may be rotated in any convenient manner, and its cranks $a\,a$, are connected, by means of pitman rods, $b\,b$, to a horizontal reciprocating plate, D, the bottom surface of which should be in a plane parallel to the top surface of the bed-plate, A, as shown in figs. 2 and 3. The ends of the top plate, D, are supported and guided by means of two longitudinal guides, E E, which are so applied to the inside surfaces of the standards, that they can both be adjusted up or down vertically, by means of the two adjusting screws, $g\,g$, which have their bearings upon offsets $g'\,g'$, at the upper ends of the said standards. I also employ two steadying screws $h\,h$, for each guide, E, which are tapped through it, so that when these guides and their sliding-plate D, have been properly adjusted and levelled, the bottom ends of the screws, $h\,h$, are brought to bear upon the bed-plate, A, thus fixing the sliding-plate guides in the desired position. The vertical tenons, $i\,i$, on the standards, B B, entering corresponding grooves in the guides, E E, prevent the latter from tilting and allow them to be adjusted up or down in a horizontal plane. The rod or shaft, $s$, figs. 2 and 3, which is to be straightened is introduced between the bed-plate A, and its slide, D, when the latter has been drawn back to the position shown in fig. 2; previously to which the space between the two plates A and D, should be regulated according to the diameter of the rod or shaft, which it is desired to straighten, by means of the adjusting screws, $g\,h$; the shaft C is then rotated so as to reciprocate the slide D, and thus roll the shaft $s$ about its own axis upon the bed-plate.

The operation of straightening the rods or shafts is conducted while they are hot, consequently they are made perfectly cylindrical, and when they have cooled they have no tendency to spring or buckle.

Having thus described my invention, what I claim as new, and desire to secure by Letters Patent, is—

1. The combination of a reciprocating slide D, which is vertically adjustable, with the bed-plate A, for the purpose of straightening rods or shafts, substantially as described.

2. Supporting the ends of the slide D, by means of guides E E, having adjusting screws $g\,g$, and steadying screws $h\,h$, applied to them substantially as and for the purposes described.

ROBERT SAFELY.

Witnesses:
    E. W. FULLER,
    GEO. L. STEENBERGH.